(12) United States Patent
Iizuka et al.

(10) Patent No.: US 11,725,574 B2
(45) Date of Patent: Aug. 15, 2023

(54) OPERATION MECHANISM OF TURBOCHARGER

(71) Applicant: IHI Corporation, Tokyo (JP)

(72) Inventors: Kuniaki Iizuka, Tokyo (JP); Asako Yasui, Tokyo (JP); Hayata Sakaida, Tokyo (JP); Toshihiro Sugitani, Tokyo (JP); Yuichiro Akiyama, Tokyo (JP); Takehiko Kato, Tokyo (JP)

( * ) Notice: Subject to any disclaimer, the term of this patent is extended or adjusted under 35 U.S.C. 154(b) by 0 days.

(21) Appl. No.: 17/713,239

(22) Filed: Apr. 5, 2022

(65) Prior Publication Data

US 2022/0228525 A1    Jul. 21, 2022

Related U.S. Application Data

(63) Continuation of application No. PCT/JP2020/030464, filed on Aug. 7, 2020.

(30) Foreign Application Priority Data

Oct. 10, 2019    (JP) ................. 2019-187109

(51) Int. Cl.
*F02B 37/18*    (2006.01)

(52) U.S. Cl.
CPC ............ *F02B 37/186* (2013.01); *F02B 37/18* (2013.01); *F02B 37/183* (2013.01)

(58) Field of Classification Search
CPC ....... F02B 37/18; F02B 37/183; F02B 37/186
See application file for complete search history.

(56) References Cited

U.S. PATENT DOCUMENTS 9,206,735 B2    12/2015    Hadas et al.
2010/0024414 A1*    2/2010    Hittle ............ F02B 37/183
                                                    60/624
(Continued)

FOREIGN PATENT DOCUMENTS

JP    S62-111941    7/1987
JP    2003-148155    5/2003
(Continued)

OTHER PUBLICATIONS

International Search Report dated Oct. 20, 2020 for PCT/JP2020/030464.
(Continued)

*Primary Examiner* — Audrey B. Walter
(74) *Attorney, Agent, or Firm* — Soei Patent & Law Firm (57) ABSTRACT

An operation mechanism of a turbocharger includes: a driving member undergoes a reciprocating movement; a link plate rotationally coupled to the driving member through a first hinge-portion, wherein a first rotation-center of the first hinge-portion is moves linearly along a virtual line in a reciprocating manner in response to the reciprocating movement; and an operation lever. The operation lever includes: a first end operates a flow regulator of the turbocharger, wherein a swing center of the operation lever is located at the first end; and a second end rotationally coupled to the link plate through a second hinge-portion including a second rotation-center, wherein the second end is swings relative to the swing center when the first rotation-center moves linearly along the virtual line, and wherein a distance from the swing center to the second rotation-center is shorter than a distance from the swing center to the virtual line.

20 Claims, 6 Drawing Sheets

(56) References Cited

U.S. PATENT DOCUMENTS

| | | | |
|---|---|---|---|
| 2012/0001104 A1 | 1/2012 | Shimada et al. | |
| 2012/0001111 A1 | 1/2012 | Takeda et al. | |
| 2013/0118161 A1 | 5/2013 | Ehrmann et al. | |
| 2016/0053675 A1* | 2/2016 | Mehne | F02B 37/186 251/279 |
| 2017/0051664 A1 | 2/2017 | Vlachy et al. | |
| 2018/0334953 A1 | 11/2018 | Colley | |

FOREIGN PATENT DOCUMENTS

| | | |
|---|---|---|
| JP | 2011-247398 | 12/2011 |
| JP | 2012-013180 | 1/2012 |
| JP | 2012-132554 | 7/2012 |
| JP | 2013-531179 | 8/2013 |
| JP | 2013-210101 | 10/2013 |
| JP | 5845650 | 1/2016 |
| WO | 2012/010252 | 1/2012 |

OTHER PUBLICATIONS

International Preliminary Report on Patentability with Written Opinion dated Apr. 21, 2022 for PCT/JP2020/030464.

\* cited by examiner

OPERATION MECHANISM OF TURBOCHARGER

CROSS-REFERENCE TO RELATED APPLICATIONS

This application is a continuation application of PCT Application No. PCT/JP2020/030464, filed on Aug. 7, 2020, which claims the benefit of priority from Japanese Patent Application No. 2019-187109, filed on Oct. 10, 2019, the entire contents of which are incorporated herein by reference.

BACKGROUND

A turbocharger such as that described in Japanese Patent No. 5845650 is known may be configured to control a pressure of air supplied to an internal combustion engine by including a bypass flow path which directly connects an exhaust gas inlet and an exhaust gas outlet of a turbine and a wastegate valve which opens and closes the bypass flow path. When the pressure of the air supplied to the internal combustion engine exceeds a predetermined value, the wastegate valve is opened so that a part of an exhaust gas supplied to the turbine is discharged through the bypass flow path. When a rod of an actuator moves forward and backward, a lever hinged to the tip of the rod swings and a rotation shaft of a valve body rotates so that the wastegate valve is opened and closed.

SUMMARY

An example operation mechanism of a turbocharger includes: a driving member configured to undergo a reciprocating movement; a link plate rotationally coupled to the driving member through a first hinge portion, wherein a first rotation center of the first hinge portion is configured to move linearly along a virtual line in a reciprocating manner in response to the reciprocating movement of the driving member; and an operation lever. The operation lever includes: a first end configured to operate a flow regulator of the turbocharger, wherein a swing center of the operation lever is located at the first end; and a second end rotationally coupled to the link plate through a second hinge portion including a second rotation center, wherein the second end of the operation lever is configured to swing relative to the swing center when the first rotation center moves linearly along the virtual line, and wherein a distance from the swing center to the second rotation center is shorter than a distance from the swing center to the virtual line.

DETAILED DESCRIPTION

In the following description, with reference to the drawings, the same reference numbers are assigned to the same components or to similar components having the same function, and overlapping description is omitted.

An example operation mechanism of a turbocharger includes: a driving member configured to undergo a reciprocating movement; a link plate rotationally coupled to the driving member through a first hinge portion, wherein a first rotation center of the first hinge portion is configured to move linearly along a virtual line in a reciprocating manner in response to the reciprocating movement of the driving member; and an operation lever. The operation lever includes: a first end configured to operate a flow regulator of the turbocharger, wherein a swing center of the operation lever is located at the first end; and a second end rotationally coupled to the link plate through a second hinge portion including a second rotation center, wherein the second end of the operation lever is configured to swing relative to the swing center when the first rotation center moves linearly along the virtual line, and wherein a distance from the swing center to the second rotation center is shorter than a distance from the swing center to the virtual line.

In some examples, the flow regulator may comprise a moving part configured to adjust a flow rate of a turbine. The movable part may be a valve body of a wastegate valve opened and closed by swinging the operation lever. In some examples, the turbocharger may further include an electric actuator generating the driving force.

In some examples, a swing range of the operation lever by the operation mechanism may be a range from a posture in which the rotation center of the second hinge portion is located on a perpendicular line drawn from the swing center to the virtual line to a posture in which the rotation center of the second hinge portion moves by a predetermined amount in a direction opposite to the first hinge portion.

Figure 1:
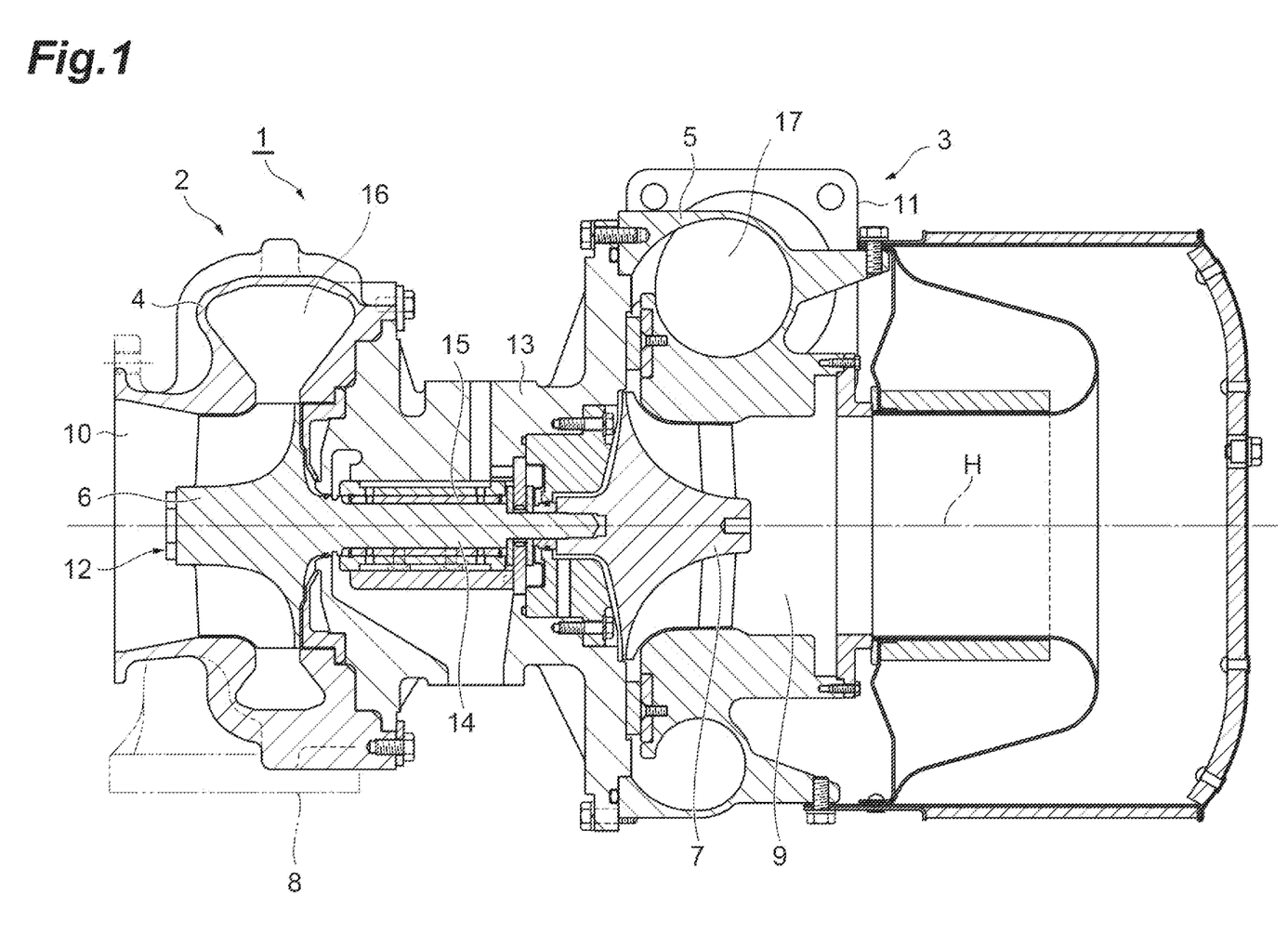
FIG. 1 is a cross-sectional view of an example turbocharger.

Hereinafter, an example turbocharger will be described in detail with reference to the drawings. FIG. 1 is a cross-sectional view of an example turbocharger 1 including a rotating axis H. The turbocharger 1 is applied to, for example, an internal combustion engine of a ship or a vehicle.

As shown in FIG. 1, the turbocharger 1 includes a turbine 2 and a compressor 3. The turbine 2 includes a turbine housing 4 and a turbine impeller 6 accommodated in the turbine housing 4. The turbine housing 4 includes a scroll flow path 16 which extends in the circumferential direction around the turbine impeller 6. The compressor 3 includes a compressor housing 5 and a compressor impeller 7 accommodated in the compressor housing 5. The compressor housing 5 includes a scroll flow path 17 extending in the circumferential direction around the compressor impeller 7.

The turbine impeller 6 is provided at one end of a rotating shaft 14 and the compressor impeller 7 is provided at the other end of the rotating shaft 14. A bearing housing 13 is provided between the turbine housing 4 and the compressor housing 5. The rotating shaft 14 is rotatably supported by the bearing housing 13 through a bearing 15 and the rotating shaft 14, the turbine impeller 6, and the compressor impeller 7 rotate around the rotating axis H as an integral rotating body 12.

The turbine housing 4 is provided with an exhaust gas inlet 8 and an exhaust gas outlet 10. An exhaust gas discharged from an internal combustion engine flows into the turbine housing 4 through the exhaust gas inlet 8, flows into the turbine impeller 6 through the scroll flow path 16, and rotates the turbine impeller 6. Then, the exhaust gas flows out of the turbine housing 4 through the exhaust gas outlet 10.

The compressor housing 5 is provided with an inlet 9 and an outlet 11. When the turbine impeller 6 rotates as described above, the compressor impeller 7 rotates through the rotating shaft 14. The rotating compressor impeller 7 intakes external air through the inlet 9. The air passes through the compressor impeller 7 and the scroll flow path 17 to be compressed and is discharged from the outlet 11. The compressed air discharged from the outlet 11 is supplied to the above-described internal combustion engine.

Figure 2:
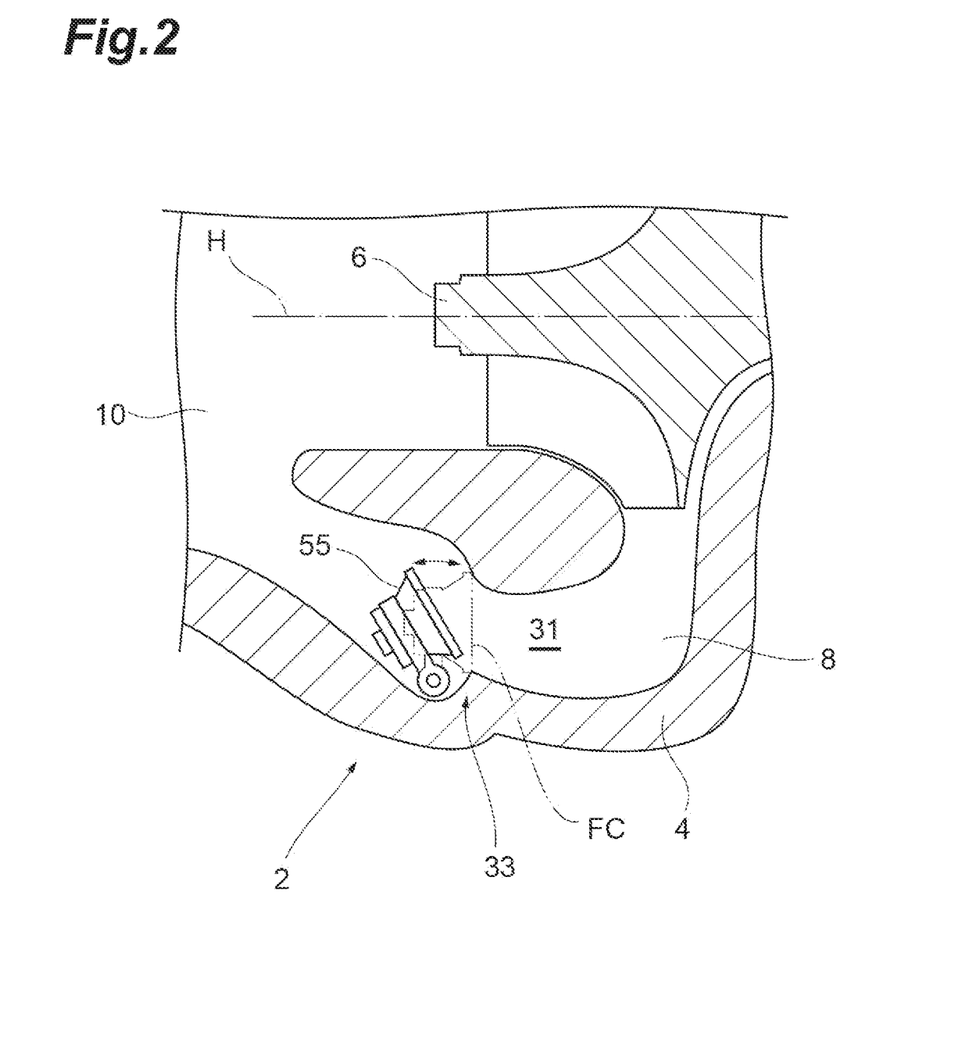
FIG. 2 is a cross-sectional view showing the vicinity of an example wastegate valve.

As shown in FIG. 2, the turbocharger 1 includes a bypass flow path 31 and a wastegate valve 33. The bypass flow path 31 directly connects the exhaust gas inlet 8 of the turbine 2 and the exhaust gas outlet 10. The wastegate valve 33 is a flow regulator that opens and closes the bypass flow path 31. By adjusting the opening degree of the wastegate valve 33, the amount of the exhaust gas bypassing the turbine 2 is adjusted and the flow rate of the turbine 2 is adjusted. The pressure of the compressed air supplied to the internal combustion engine is adjusted by adjusting the flow rate of the turbine 2.

Figure 3:
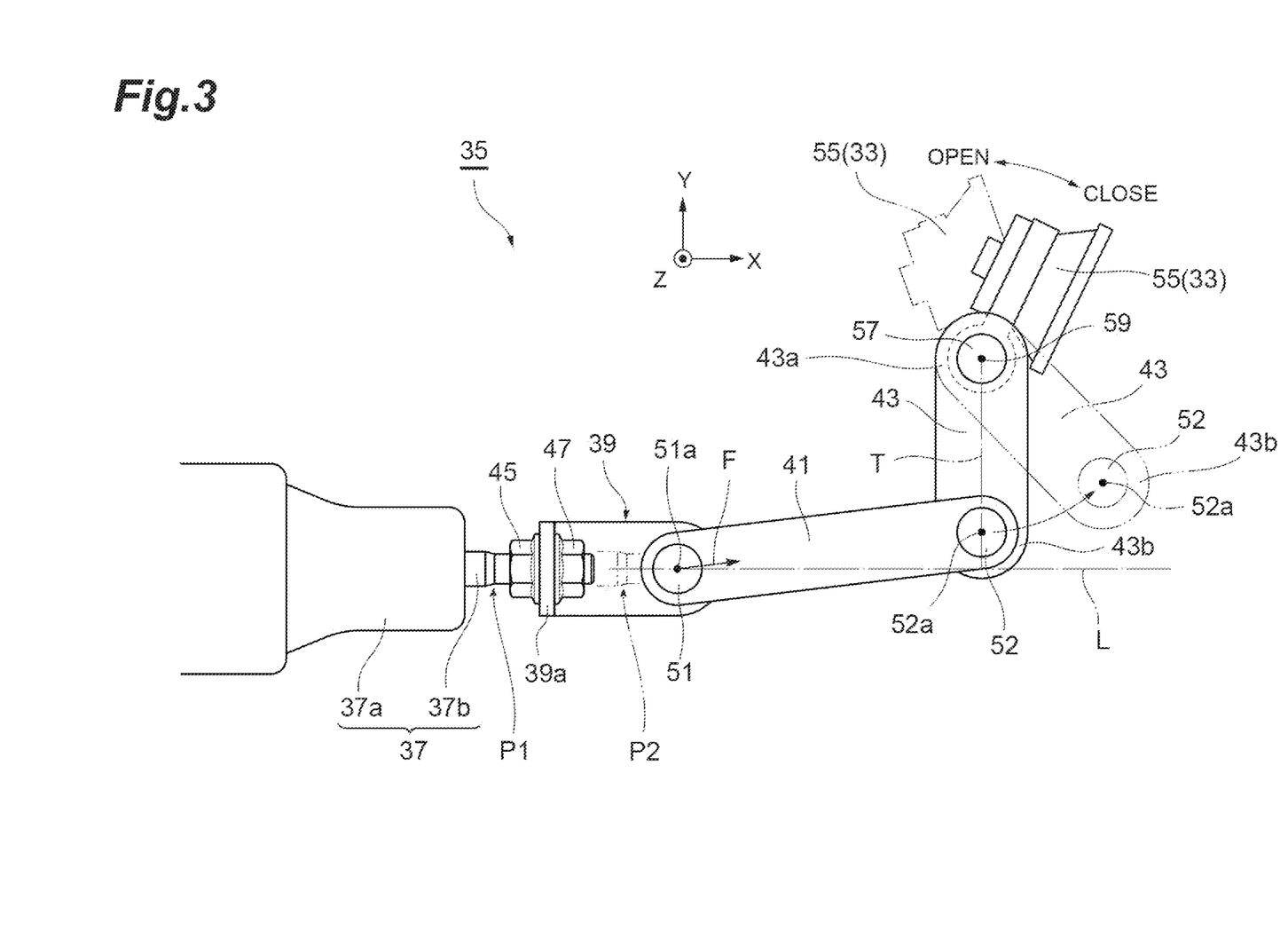
FIG. 3 is an enlarged view of an example operation mechanism.

As shown in FIG. 3, the turbocharger 1 includes an operation mechanism 35 for opening and closing the wastegate valve 33. The operation mechanism 35 includes an electric actuator 37, a joint member 39, a link plate 41, and an operation lever 43. Hereinafter, as shown in each drawing, the X, Y, and Z directions orthogonal to each other are defined and used for convenience of description. X direction is a direction parallel to a direction along which a rod 37b (described in further detail later) extends and retracts. When the terms of "front" and "rear" are used, the +X direction to which the rod 37b extends is the front; and the −X direction to which the rod 37b retracts is the rear. Y direction is a direction parallel to a perpendicular line T (a second virtual line) drawn from a swing center 59 (described in further detail later) to an extension of the direction along which the rod 37b extends and retracts. When the terms of "up" and "down" are used, the +Y direction, a direction along the perpendicular line form the extension to the swing center 59, is up; and the −Y direction, a direction along the perpendicular line T form the swing center 59 to the extension, is down. Hereinafter, the positional relationship and operation of each part of the operation mechanism 35 in a state of being projected on the XY plane will be described.

The operation lever 43 includes a rotation shaft 57 of a valve body 55 of the wastegate valve 33. The rotation shaft 57 is provided at an upper end portion 43a (a first end) of the operation lever 43 and penetrates the turbine housing 4 to be connected to the valve body 55. The operation lever 43, the rotation shaft 57, and the valve body 55 are relatively swingable or rotatable in the XY plane around the swing center 59 with respect to the turbine housing 4. The swing center 59 of the operation lever 43 is located at the upper end portion 43a. The swing center 59 is also the center of the rotation shaft 57. The upper end portion 43a is configured to operate the wastegate valve 33. When the operation lever 43 rotates around the swing center 59 as described above, the valve body 55 rotates and the wastegate valve 33 is opened and closed. The valve body 55 of the wastegate valve 33 opens and closes when a lower end portion 43b (a second end) of the operation lever 43 swings relative to the swing center 59.

The electric actuator 37 is a driving source that generates a driving force for swinging or rotating the operation lever 43. The electric actuator 37 includes, for example, a main body portion 37a fixed to the turbine housing 4 and the rod (driving member) 37b. The rod 37b extends from the main body portion 37a in the +X direction. The rod 37b is configured to extend and retract in the +X direction with respect to the main body portion 37a in response to the driving force.

Figure 4:
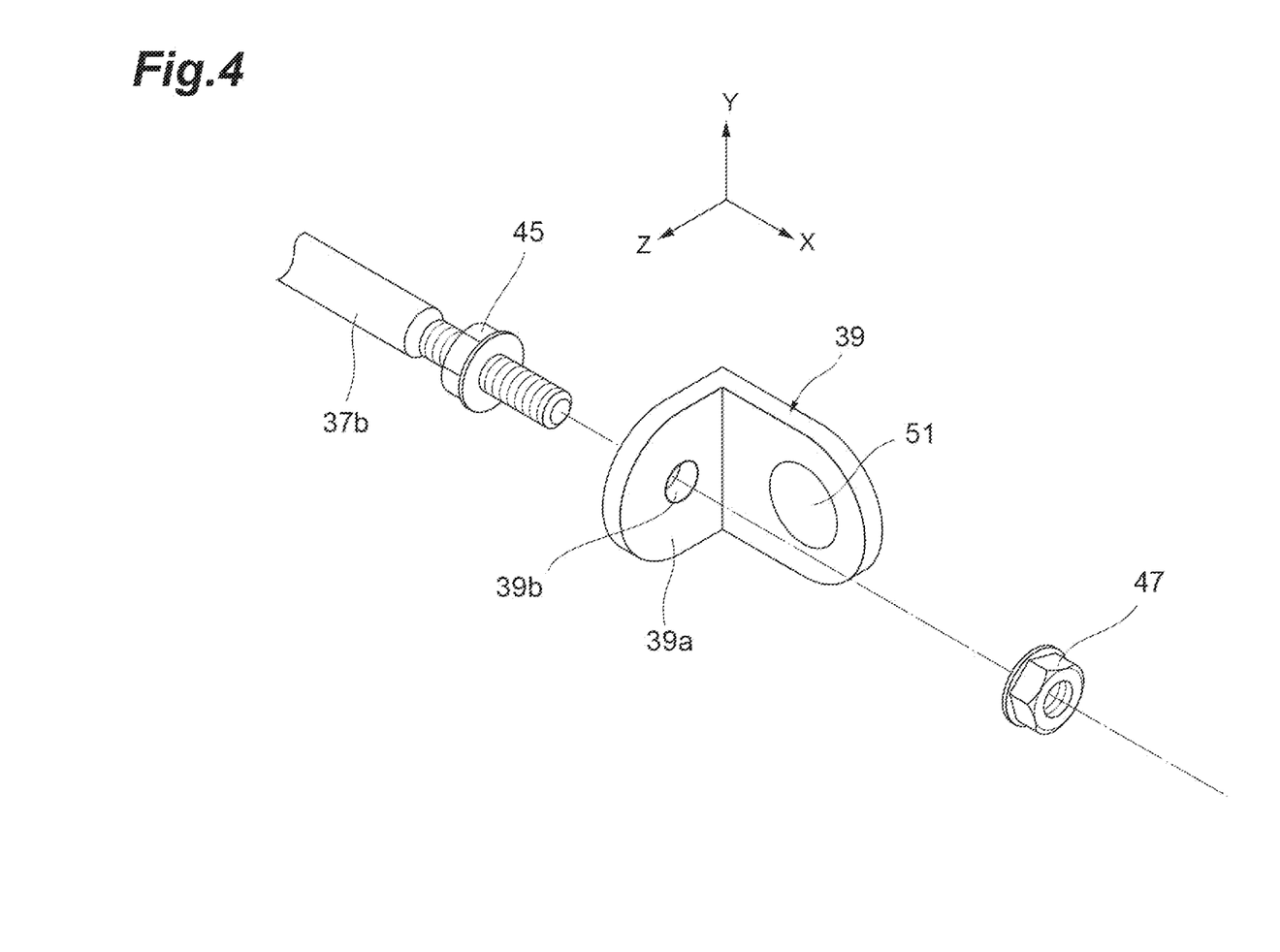
FIG. 4 is an exploded perspective view showing a fastening state between a joint member and a rod.

As shown in FIG. 4, the front end portion of the rod 37b is threaded and nuts 45 and 47 are screwed thereto. The rear end portion of the joint member 39 is provided with a flat plate portion 39a having a flat plate shape orthogonal to the X direction. The flat plate portion 39a is provided with a bolt hole (a hole) 39b penetrating in the X direction. The front end portion of the rod 37b is inserted through the bolt hole 39b of the flat plate portion 39a which is sandwiched between two nuts 45 and 47 in the front and rear direction. There is a clearance between the rod 37b and an upper edge of the bolt hole 39b. By tightening the nuts 45 and 47 in this state, the joint member 39 is fastened and fixed to the front end portion of the rod 37b. The position of the joint member 39 in the X direction with respect to the rod 37b may be adjusted by adjusting the screwing positions of the nuts 45 and 47 with respect to the rod 37b.

As shown in FIG. 3, the link plate 41 is rotationally coupled to the rod 37b through a first hinge portion 51 located on the joint member 39. The rear end portion of the link plate 41 is coupled to the front end portion of the joint member 39 through the first hinge portion 51. The link plate 41 is relatively rotatable in the XY plane around a rotation center (a first rotation center) 51a of the first hinge portion 51 with respect to the joint member 39. The front end portion of the link plate 41 is coupled to the lower end portion 43b of the operation lever 43 through a second hinge portion 52. The lower end portion 43b rotationally coupled to the link plate 41 through the second hinge portion 52 including a rotation center (a second rotation center) 52a. The link plate 41 is relatively rotatable in the XY plane around the rotation center 52a of the second hinge portion 52 with respect to the operation lever 43.

In the operation mechanism 35 with the above-described structure, the rod 37b is configured to undergo a reciprocating movement. When driving electric power is supplied to the electric actuator 37, the rod 37b extends and retracts in the X direction by the driving force of the electric actuator 37. The reciprocating movement causes the rod 37b to move between a retracted position P1 (a first reciprocating position) and an extended position P2 (a second reciprocating position) along a virtual line L parallel to the X direction. The virtual line L is aligned to the axis of the rod 37b. The joint member 39 moves in a reciprocating manner in the X direction in response to the reciprocating movement of the rod 37b. The rotation center 51a of the first hinge portion 51 is configured to move linearly along the virtual line L in a reciprocating manner in response to the reciprocating movement of the rod 37b and the joint member 39. The driving force is transmitted to the second hinge portion 52 of the lower end portion 43b of the operation lever 43 through the link plate 41 by the reciprocating movement of the rod 37b. The operation lever 43 swings or rotates around the swing center 59 in response to the movement of the rotation center 52a. Accordingly, the valve body 55 rotates so that the wastegate valve 33 is opened and closed. The virtual line L is an extension of the direction along which the rod 37b extends and retracts. The wastegate valve 33 is configured to reduce the flow rate of the turbine 2 in response to a swing or rotation of the operation lever 43 by the operation mechanism 35 such that the second hinge portion 52 moves in a direction opposite to the rod 37b.

The solid line in FIG. 3 indicates a state in which the wastegate valve 33 is fully closed (hereinafter, simply referred to as a "fully closed state FC" as shown in FIG. 2).

The rotation center 52*a* of the second hinge portion 52 is located between the swing center 59 and the virtual line L when the rod 37*b* is located at the retracted position P1. For example, in the fully closed state FC, the rotation center 52*a* is located on the perpendicular line T drawn from the swing center 59 to the virtual line L. When the rod 37*b* of the electric actuator 37 extends in the +X direction from the posture of the operation lever 43, the rotation center 52*a* moves in the +X direction and the operation lever 43 rotates in the counter-clockwise rotation direction in FIG. 3. As indicated by the two-dotted chain line in FIG. 3, the wastegate valve 33 is fully opened (hereinafter, simply referred to as a "fully open state") in a state in which the rotation center 52*a* moves by a predetermined amount in the +X direction.

The swing range of the operation lever 43 by the operation mechanism 35 is the range from a posture (corresponding to the fully closed state FC) in which the rotation center 52*a* is located on the perpendicular line T drawn from the swing center 59 to the virtual line L to a posture (corresponding to the fully open state) in which the rotation center 52*a* moves by a predetermined amount in the direction opposite to the first hinge portion 51. The rotation center 52*a* of the second hinge portion 52 is located on the perpendicular line T that passes through the swing center 59 and that is perpendicular to the virtual line L along which the first hinge portion 51 is configured to move when the rod 37*b* is located at the retracted position P1. The rotation center 52*a* is located off the perpendicular line T when the rod 37*b* is located at the extended position P2. For example, the movement range of the rotation center 52*a* by the operation mechanism 35 corresponds to the region on the front side of the perpendicular line T drawn from the swing center 59 to the virtual line L. The swing range of the operation lever 43 by the operation mechanism 35 is a region on the front side of the perpendicular line T drawn from the swing center 59 of the operation lever 43 to the virtual line L.

In the operation mechanism 35, a distance from the swing center 59 of the operation lever 43 to the rotation center 52*a* of the second hinge portion 52 is shorter than a distance from the swing center 59 to the virtual line L. The rotation center 52*a* of the second hinge portion 52 is located between the swing center 59 and the virtual line L when the wastegate valve 33 is in the fully closed state FC. A difference between the distance from the swing center 59 to the rotation center 52*a* of the second hinge portion 52 and the distance from the swing center 59 to the virtual line L is larger than the clearance between the rod 37*b* and the upper edge of the bolt hole 39*b*. With this configuration, the rotation center 52*a* does not move to the region lower than the virtual line L by the swing of the operation lever 43. In the fully closed state FC, the line connecting the rotation center 51*a* and the rotation center 52*a* is inclined with respect to the virtual line L. The line connecting the first hinge portion 51 and the second hinge portion 52 is inclined with respect to the virtual line L so that the second hinge portion 52 is farther away from the virtual line L than the first hinge portion 51.

The operation and effect of the turbocharger 1 including the above-described operation mechanism 35 will be described in further detail. First, as a comparative example of the operation mechanism 35, a case in which the distance from the swing center 59 of the operation lever 43 to the rotation center 52*a* of the second hinge portion 52 is set to be the same as the distance from the swing center 59 to the virtual line L is considered. In this setting, the line connecting the rotation center 51*a* and the rotation center 52*a* is orthogonal to the line connecting the swing center 59 and the rotation center 52*a* in the fully closed state FC.

Figure 5:
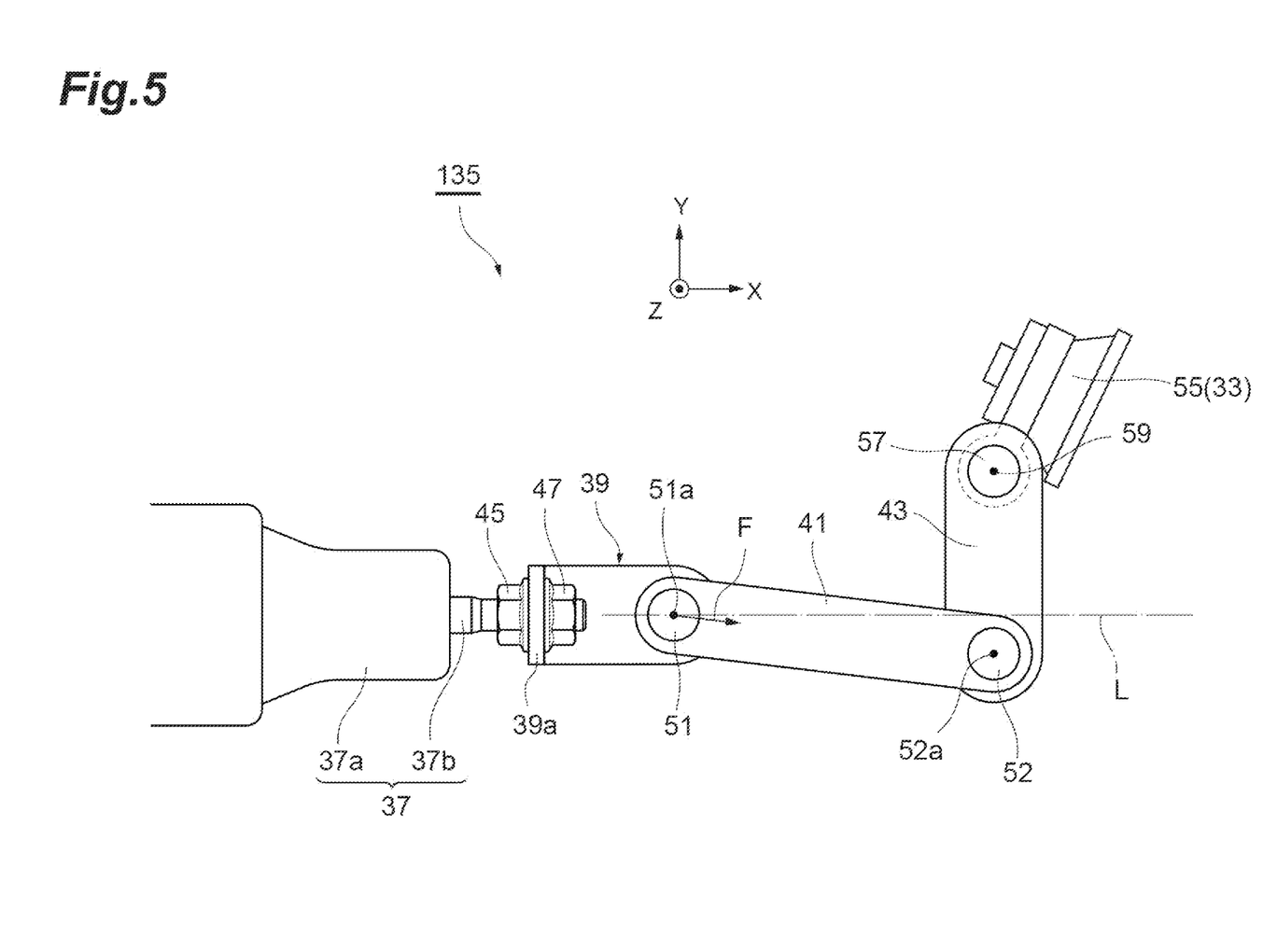
FIG. 5 is an enlarged view of an operation mechanism of a comparative example.
Figure 6:
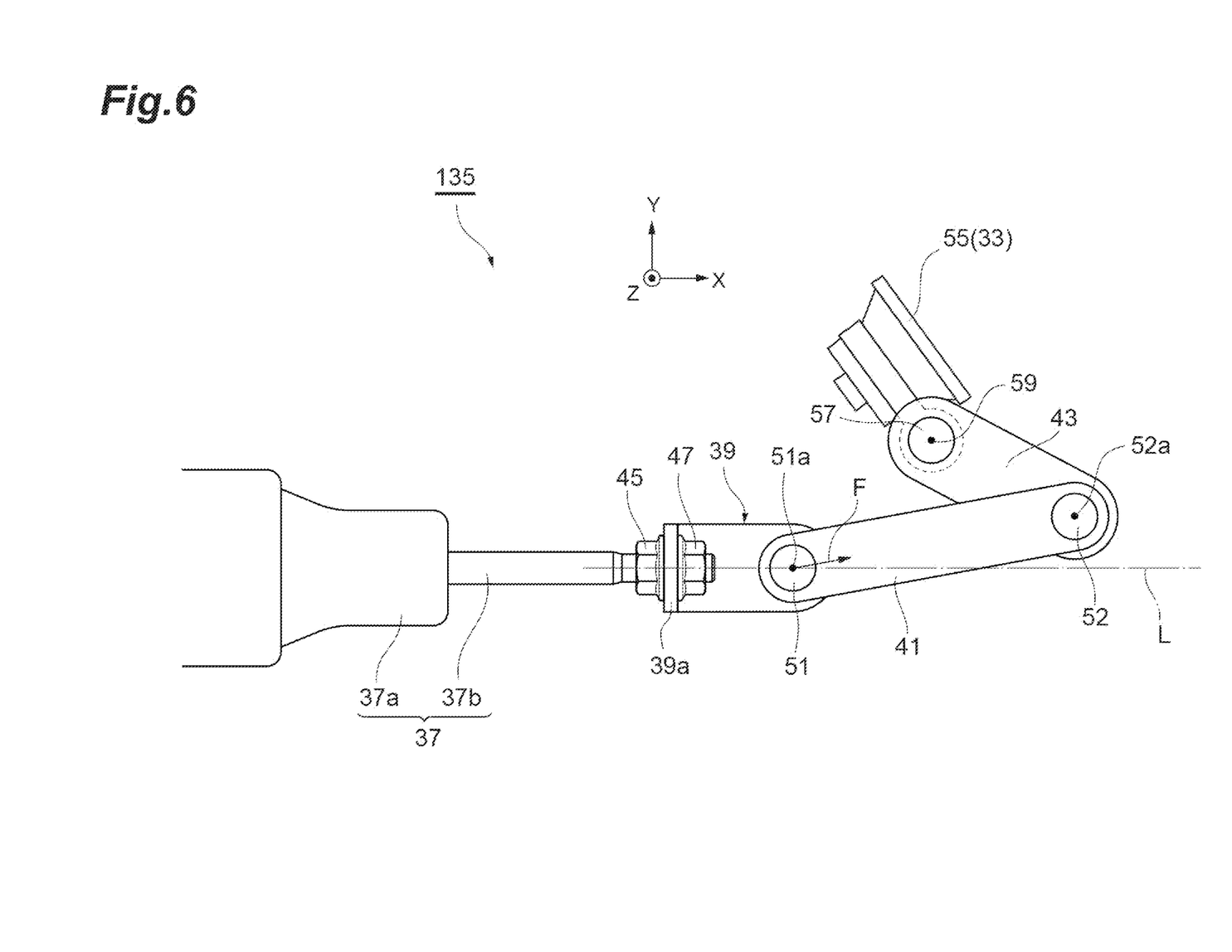
FIG. 6 is an enlarged view showing another state of the operation mechanism of the comparative example.

However, according to this setting, the state shown in FIG. 5 may occur due to factors such as a case in which the size of the operation lever 43 is slightly large due to the tolerance of the parts. Hereinafter, the operation mechanism in the state shown in FIG. 5 is referred to as a comparative operation mechanism 135. In the comparative operation mechanism 135, the distance from the swing center 59 of the operation lever 43 to the rotation center 52*a* of the second hinge portion 52 is longer than the distance from the swing center 59 to the virtual line L. The rotation center 52*a* is located below the virtual line L in the fully closed state FC as shown in FIG. 5, but the rotation center 52*a* is located above the virtual line L in the fully open state as shown in FIG. 6. For example, the rotation center 52*a* of the comparative operation mechanism 135 moves upward or downward from the virtual line L by the opening and closing operation of the wastegate valve 33.

The valve body 55 of the wastegate valve 33 receives the fluid force of the exhaust gas. The fluid force rotates the operation lever 43 in the counter-clockwise rotation direction in FIGS. 5 and 6. The force caused by the fluid force pulls the joint member 39 toward the second hinge portion 52 through the link plate 41, For example, a force F indicted by an arrow in the drawing acts on the joint member 39. The Y-direction component of the force F is directed upward when the rotation center 52*a* is located above the virtual line L (see FIG. 6). The Y-direction component of the force F is directed downward when the rotation center 52*a* is located below the virtual line L (see FIG. 5).

As shown in FIGS. 5 and 6, since the rotation center 52*a* is located above or below the virtual line L as described above in the comparative operation mechanism 135, a force having an upward component and a force having a downward component alternately act on the joint member 39 during operation. When such a force repeatedly acts on the joint member 39, there is a possibility that the fixed position of the joint member 39 with respect to the rod 37*b* may be displaced up and down. For example, the joint member 39 may be displaced up and down with respect to the rod 37*b* by sliding up and down against the fastening force of the nuts 45 and 47 by the clearance between the rod 37*b* and the bolt hole 39*b*.

The correlation between the extension and retraction amount of the rod 37*b* and the rotation amount of the rotation shaft 57 may deviate or get out of synchronization. As a result, the opening and closing control of the wastegate valve 33 may become unstable in the comparative operation mechanism 135. Since the turbocharger 1 adopts the electric actuator 37 to control the opening degree of the wastegate valve 33 accurately, the turbocharger tends to be affected by the slight displacement of the joint member 39 as described above. Since a force having an upward component and a force having a downward component alternately act on the joint member 39 as described above, the nuts 45 and 47 may be loosened.

On the other hand, according to the example operation mechanism 35 illustrated in FIG. 3, the rotation center 52*a* is set to be located above the virtual line L in advance in the fully closed state FC. This configuration allows the operation mechanism 35 to maintain the stability of the opening and closing control of the wastegate valve 33.

Since the rotation center 52*a* is located in the region above the virtual line L as shown in FIG. 3 in the operation mechanism 35, the Y-direction component of the force F acting on the joint member 39 is directed upward. Even when the fixed position of the joint member 39 is displaced upward, the lower edge in the bolt hole 39*b* of the joint member 39 eventually hits the rod 37b and then the fixed position of the joint member 39 with respect to the rod 37b is stabilized. Thus, the stability of opening and closing control of the wastegate valve 33 can be maintained. When assembling the operation mechanism 35, the joint member 39 may be assembled in advance so that the lower edge of the bolt hole 39b of the joint member 39 is in contact with the rod 37b. By tightening the nuts 45 and 47 in this state, the joint member 39 is fastened and fixed to the front end portion of the rod 37b in the state where the lower edge of the bolt hole 39b of the joint member 39 remains in contact with the rod 37b after the operation mechanism 35 is fully assembled.

It is to be understood that not all aspects, advantages and features described herein may necessarily be achieved by, or included in, any one particular example. Indeed, having described and illustrated various examples herein, it should be apparent that other examples may be modified in arrangement and detail.

For example, in the above-described embodiments, an example of the operation mechanism 35 for opening and closing the wastegate valve 33 has been described, but the configuration of the operation mechanism 35 can be also applied to the operation mechanism of the other flow regulators of the turbocharger 1. One of other flow regulators of the turbocharger 1 may be, for example, a nozzle of a variable nozzle mechanism that adjusts the flow rate of the turbine 2.

We claim all modifications and variations coining within the spirit and scope of the subject matter claimed herein.

The invention claimed is:

1. An operation mechanism of a turbocharger, the operation mechanism comprising:
    a driving member configured to undergo a reciprocating movement;
    a link plate rotationally coupled to the driving member through a first hinge portion, wherein a first rotation center of the first hinge portion is configured to move linearly along a virtual line in a reciprocating manner in response to the reciprocating movement of the driving member; and
    an operation lever including:
        a first end configured to operate a flow regulator of the turbocharger,
        wherein a swing center of the operation lever is located at the first end; and
        a second end rotationally coupled to the link plate through a second hinge portion including a second rotation center,
    wherein the second end of the operation lever is configured to swing relative to the swing center when the first rotation center moves linearly along the virtual line, and
    wherein a distance from the swing center to the second rotation center is always shorter than the shortest distance from the swing center to the virtual line.

2. The operation mechanism according to claim 1, wherein the flow regulator is configured to adjust a flow rate of a turbine.

3. The operation mechanism according to claim 2, wherein the flow regulator comprises a valve body of a wastegate valve that is opened and closed when the second end of the operation lever swings relative to the swing center.

4. The operation mechanism according to claim 1,
    wherein the reciprocating movement causes the driving member to move between a retracted position and an extended position along the virtual line,
    wherein the second rotation center of the second hinge portion is located on a second virtual line that passes through the swing center and that is perpendicular to the virtual line along which the first hinge portion is configured to move, when the driving member is located at the retracted position, and
    wherein the second rotation center is located off the second virtual line when the driving member is located at the extended position.

5. The operation mechanism according to claim 1,
    wherein the reciprocating movement causes the driving member to move between a first reciprocating position and a second reciprocating position along the virtual line,
    wherein the second rotation center of the second hinge portion is located on a second virtual line that passes through the swing center and that is perpendicular to the virtual line along which the first hinge portion is configured to move, when the driving member is located at the first reciprocating position, and
    wherein the second rotation center is located off the second virtual line when the driving member is located at the second reciprocating position.

6. The operation mechanism according to claim 5, wherein the second end of the operation lever swings away from the driving member when the driving member moves from the first reciprocating position to the second reciprocating position.

7. The operation mechanism according to claim 5, wherein the second rotation center of the second hinge portion is located between the swing center and the virtual line when the driving member is located at the first reciprocating position.

8. A turbocharger comprising the operation mechanism according to claim 5, the flow regulator, and a turbine,
    wherein the flow regulator is configured to reduce a flow rate of the turbine when the driving member moves from the first reciprocating position to the second reciprocating position.

9. The turbocharger according to claim 8,
    wherein the flow regulator comprises a valve body of a wastegate valve, and
    wherein the second rotation center of the second hinge portion is located between the swing center and the virtual line when the wastegate valve is in a fully closed state.

10. The turbocharger according to claim 8, wherein the flow regulator comprises a nozzle of a variable nozzle mechanism that adjusts the flow rate of the turbine.

11. The operation mechanism according to claim 1, further comprising a joint member fastened to the driving member, and
    wherein the link plate is rotationally coupled to the driving member through the first hinge portion located on the joint member.

12. A method of assembling the operation mechanism according to claim 11, the method comprising:
    inserting the driving member through a hole in the joint member so that a lower edge of the hole of the joint member is in contact with the driving member; and
    fastening the joint member to the driving member so that the lower edge of the hole of the joint member remains in contact with the driving member after the operation mechanism is fully assembled.

13. The method according to claim 12, wherein a difference between the distance from the swing center to the second rotation center of the second hinge portion and the shortest distance from the swing center to the virtual line is larger than a clearance between the driving member and an upper edge of the hole.

14. A turbocharger comprising:
a turbine;
a flow regulator configured to adjust a flow rate of the turbine;
a driving member configured to undergo a reciprocating movement;
a link plate rotationally coupled to the driving member through a first hinge portion, wherein a first rotation center of the first hinge portion is configured to move linearly along a virtual line in a reciprocating manner in response to the reciprocating movement of the driving member; and
an operation lever including:
   a first end attached to the flow regulator, wherein a swing center of the operation lever is located at the first end; and
   a second end rotationally coupled to the link plate through a second hinge portion including a second rotation center,
wherein the second end of the operation lever is configured to swing relative to the swing center when the first rotation center moves linearly along the virtual line, and
wherein a distance from the swing center to the second rotation center is always shorter than the shortest distance from the swing center to the virtual line.

15. The turbocharger according to claim 14, further comprising a joint member fastened to the driving member,
wherein the link plate is rotationally coupled to the driving member through the first hinge portion located on the joint member.

16. The turbocharger according to claim 14,
wherein the reciprocating movement causes the driving member to move between a first reciprocating position and a second reciprocating position along the virtual line,
wherein the second rotation center of the second hinge portion is located on a second virtual line that passes through the swing center and that is perpendicular to the virtual line along which the first hinge portion is configured to move, when the driving member is located at the first reciprocating position, and
wherein the second rotation center is located off the second virtual line when the driving member is located at the second reciprocating position.

17. The turbocharger according to claim 16, wherein the second end of the operation lever swings away from the driving member when the driving member moves from the first reciprocating position to the second reciprocating position.

18. The turbocharger according to claim 16, wherein the second rotation center of the second hinge portion is located between the swing center and the virtual line when the driving member is located at the first reciprocating position.

19. The turbocharger according to claim 16,
wherein the flow regulator is configured to reduce a flow rate of the turbine when the driving member moves from the first reciprocating position to the second reciprocating position.

20. The turbocharger according to claim 19,
wherein the flow regulator comprises a valve body of a wastegate valve, and
wherein the second rotation center of the second hinge portion is located between the swing center and the virtual line when the wastegate valve is in a fully closed state.

* * * * *